United States Patent Office 3,425,794
Patented Feb. 4, 1969

3,425,794
METHOD OF PREPARING HETEROPOLY COMPOUNDS
Vincent Chiola and Clarence D. Vanderpool, Towanda, Pa., assignors to Sylvania Electric Products Inc., a corporation of Delaware
No Drawing. Filed Dec. 22, 1966, Ser. No. 603,793
U.S. Cl. 23—23  21 Claims
Int. Cl. C22b 59/00, 51/00, 57/00

This invention relates broadly to the preparation of heteropoly compounds. More particularly, it is concerned with a simplified method of making heteropolytungstic and heteropolymolybdic acids and ammonium salts of the said acids wherein the other or different "metal" (including metalloid) element (i.e., heteroatom) is selected from a particular group hereafter described.

Various methods have been employed or suggested for preparing heteropoly acids of a heavy metal such as tungsten or molybdenum. For example, a commonly employed procedure for preparing phosphotungstic acid has involved, first, the preparation of an aqueous solution of sodium tungstate and disodium phosphate. The pH of this solution is then slowly adjusted to a value between 1 and 2 by the gradual addition of a mineral acid, e.g., hydrochloric acid. (The pH of the solution must be reduced to a value at which the association of the heteroatom, specifically phosphorus, with the tungsten atoms to form the heteropolytungstate compound can take place. The resulting sodium salt that forms is separated from the solution by crystallization and is redissolved in water. This latter solution is then extracted with ethyl ether, and pure phosphotungstic acid is crystallized from the ether solution. The yield is low, and the process is complicated by the necessity for employing ether as a solvent in one step of the process.

It has also been proposed to obtain, for example, phosphotungstic acid by passing a solution of a mixture of sodium phosphate and sodium tungstate directly in contact with a suitable cation-exchange resin. The effluent from this operation contains the desired phosphotungstic acid. This technique has the disadvantage that the crystals of phosphotungstic acid obtained upon evaporation of the effluent solution contain an undesirably high amount of sodium, for instance, amounts of the order of 1.2% calculated as $Na_2O$. Furthermore, the reduction of the pH value of the solution containing the tungstate salt as the solution is subjected to the action of the cation-exchange resin causes the deposition of a substantial amount of tungstic acid, $H_2WO_4$, on the surfaces of the said resin. This tungstic acid deposition reduces the yield efficiency of the process and causes inactivation of the cation-exchange resin. Additionally, the regeneration of the resin is made substantially more difficult.

An improvement in the process described in the preceding paragraph is disclosed and claimed in application Ser. No. 233,930 of John M. Laferty, Jr., filed Oct. 29, 1962, now Patent No. 3,288,562, dated Nov. 29, 1966, and assigned to the same assignee as the present invention.

In our copending application Ser. No. 435,070, filed Feb. 24, 1965, now U.S. Patent No. 3,361,518, and assigned to the same assignee as the present invention, we have disclosed and claimed a method of preparing heteropolytungstic acids wherein the disadvantages inherent in the introduction of added mineral acid to the reaction mass are obviated or minimized.

In our copending application Ser. No. 603,792, filed concurrently with the instant application and assigned to a common assignee, we have disclosed and claimed a method of producing heteropoly acids of tungsten and molybdenum that are substantially alkali-free. In the method described in this copending application, tungstic or molybdic acid is formed in situ, and the heteroatoms are different when producing heteropolytungstic and -molybdic acids than are the heteroatoms used in making the corresponding acids by the method of the present invention.

In the teachings of the prior art including patents of prior inventors, discussed above, the heteropoly acid formation has usually been obtained by acidification of a solution containing the alkali-metal salts, specifically the sodium salts, of acids containing the primary metal atom (i.e., tungsten or molybdenum) and the heteroatom.

The present invention is based on our discovery that condensation surprisingly and unobviously can be induced directly to the complex polyhedral oxide structure that characterizes polytungstic and polymolybdic acids exemplified by metatungstic acid, paratungstic acid, and polymolybdic (metamolybdic) acid, and also the ammonium salts of the said acids. In other words, the foreign ion or atom (i.e., heteroatom) of the kind with which this invention is concerned can be assimilated by, or incorporated in, the polyhedral, condensed tungstate or molybdate anion by direct reaction. For a better understanding of the invention, the following may be pointed out.

The isomorphism of metatungstates with 12-heteropolytungstates is well established. [H. J. Emeleus and J. S. Anderson, Modern Aspects of Inorganic Chemistry, chapter IX, page 323, D. Van Nostrand Company, Inc., New York, N.Y.; D. C. Kepert, Isopolytungstates, Proceedings of Inorganic Chemistry, 4, page 199 (1962); and R. W. Mooney, V. Chiola, C. W. W. Hoffman, and C. D. Vanderpool, The Dehydration of Ammonium Metatungstate, J. Elect. Chem. Soc., 109, No. 12, page 1179 (December 1962).] Polytungstates are generally believed to be coordination structures of $WO_6$ octahedra. [J. F. Keggin, Nature, 131, 908 (1933); ibid., 132, 351 (1933); and Proc. Roy. Soc. (London), 144A, 75 (1934).] In the case of heteropolytungstic acids, the octahedra are co-ordinated around a central tetrahedral ion. Three tungsten oxide octahedra share a corner of the central tetrahedral. Metatungstates contain $H_2W_{12}O_{40}^{6-}$ groups, and the central tetrahedral group is $H_2O_4$. This corresponds to a central $PO_4^{3-}$ group in 12-tungstophosphoric acid. There is also the possibility that the $WO_6$ octahedra are grouped about an empty hole instead of a tetrahedral oxyanion group. [K. F. Jahr, Naturwiss, 29, 528 (1941).] Evidence for the $H_2W_{12}O_{40}^{6-}$ anion is also found in the association of two hydrogen atoms with each metatungstate ion. The structural relationship of paratungstate, pseudo-metatungstate, and metatungstate ions is well documented in the literature.

To the best of the applicants' knowledge and belief, it was not known nor suggested in the prior art previous to their invention that a central ion or atom could be substituted or assimilated into an already existing condensed oxide polyhedral anion to form a heteropoly anion. As mentioned previously, the prior art methods almost always involved the addition of mineral acid to normal alkali-metal tungstate or alkali-metal molybdate solutions, or acidification was effected by cation exchange. Hence, the reaction products went through the paratungstate or paramolybdate stage either before or after the addition of the compound containing the heteroatom.

The important differentiation between the method herein involved and the prior art methods is that the heteropoly compounds that result from the method are derived from a starting material which is a soluble (including potentially soluble) complex oxide of the elemental metal with which the heteroatom is to be associated.

The objects of the invention will be apparent to those skilled in the art from the hereafter-described advantages.

The objects and advantages of the invention are attained by providing a direct-reaction technique for the preparation of heteropolytungstic and heteropolymolybdic acids and ammonium salts of the said acids, and wherein the heteroatom is selected from one group of heteroatoms when the heteropoly compound is heteropolytungstic acid or heteropolymolybdic acid, and which is selected from a larger group of heteroatoms (including those of the first group) when the heteropoly compound is an ammonium salt of the aforementioned heteropolytungstic and -molybdic acids.

In preparing heteropolytungstic and -molybdic acids, the heteroatom is selected from group (A) consisting of silicon, aluminum, vanadium, titanium, iron, nickel, cobalt, antimony, niobium, germanium, tin and cerium. In preparing ammonium salts of heteropolytungstic and -molybdic acids, the heteroatom is selected from the group consisting of (B) the aforementioned heteroatoms of group (A) and, in addition, arsenic, boron, and phosphorus.

Broadly described, the method comprises directly introducing the heteroatom into the condensed oxide structure of a nonheteropolytungstic or a nonheteropolymolybdic acid (that is, a polytungstic or a polymolybdic acid that contains no heteroatom) or an ammonium salt thereof by contacting, in an aqueous medium and at a temperature within the range of from about 20° C. to about 100° C., (a) a compound of the group consisting of a polytungstic acid, a polymolybdic acid, and the ammonium salts of the said acids, said acids and salts being water-soluble (including potentially water-soluble) and having a condensed oxide polyhedral structure, with (b) a substance of the group consisting of elemental metals, oxides and acids of elemental metals, and hydrolyzable organometallic compounds.

The substance of (b) has a heteroatom of the aforesaid group (A) when the heteropoly compound to be produced is heteropolytungstic acid or heteropolymolybdic acid, and has a heteroatom of group (B) when the heteropoly compound to be produced is an ammonium salt of the aforesaid heteropoly acids.

The amount of the substance of (b) in the aforementioned aqueous medium is sufficient to provide at least 0.5 gram atom, more particularly from 0.5 (or from about 1.0) to about 1.5–2.0 gram atoms, of the heteroatom for each 12 gram atoms of tungsten or molybdenum in the polytungstic or polymolybdic compounds of (a).

The heteropoly tungsten or molybdenum compound obtained as a product of the method may be utilized in solution form, but for practical reasons (including marketing and shipping), it is usually isolated from the reaction mass by any suitable means such as, for example, evaporation of the aqueous reaction medium.

From the foregoing description, it will be seen that the present invention involves a reaction of the heteroatom, in the form of elemental metal, oxide, acid, or organometallic derivative with a tungsten or molybdenum compound that already has a condensed oxide, polyhedral structure. In the case of tungsten, typical condensed oxide systems that are useful in practicing this invention are ammonium metatungstate and metatungstic acid. In the case of molybdenum, a typical condensed oxide system is polymolybdic acid (sometimes designated as "metamolybdic" acid. In the case of heteropolytungstates, any condensed, oxyanion system that contains the metatungstate or paratungstate ion or is convertible to the said ions can be used as the source of the complex tungsten.

Sources of the heteroatoms are the aforementioned elemental metals (including metalloids) of groups (A) and (B) including, for example, antimony, iron, aluminum, and boron; oxides of the metals of the aforesaid groups, e.g., boric oxide, $B_2O_3$, arsenous oxide, $As_2O_3$, and vanadium oxides having at least some solubility in the aqueous reaction medium, for instance, vanadium pentoxide, $V_2O_5$; acids of the metals of the aforesaid groups, e.g., phosphoric, $H_3PO_4$, boric, $H_3BO_3$, arsenic, $HAsO_3$ and vanadic, $HVO_3$; and hydrolyzable organometallic compounds of the alkyl or alkoxy types that contain the heteroatoms of the aforesaid groups, e.g., alcoholates of silicon and aluminum such as tetra (lower-alkyl) orthosilicates including tetraethyl orthosilicate, $(C_2H_5O)_4Si$, and the lower-alkanol esters of aluminum including aluminum isopropylate $Al(OC_3H_7)_3$, which is also known as aluminum isoproxide.

The following are among the advantages attained by practicing the present invention:

(1) The preparation of the heteropoly compound is accomplished in a minimum number of steps without the disadvantages associated with the use of a mineral acid, extraction, or low solution concentrations.

(2) The preparation of ammonium heteropoly compounds is accomplished directly by reaction of a substance comprising the heteroatom with a suitable condensed structure without the necessity of isolating free acid, removing mineral acid, and the like. (Prior to the present invention, the ammonium salts were obtained by neutralization of a solution of the free acid.)

(3) Material losses are lower and yields are higher because little or no precipitation occurs during the reaction. (In the preparation of many heteropoly compounds, acidification with mineral acid causes precipitation of mixed salts.)

(4) The normal acidity of the condensed primary compound with which the heteroatom is to be assimilated or associated, e.g., condensed tungstate or molybdate, is utilized for the reaction.

(5) The ammonium heteropoly compound is frequently more desirable than the corresponding free acid because it is more stable, crystalline, easier to isolate, or has other desirable properties or advantages.

(6) Only the theoretical quantity of the substance comprising the heteroatom is all that is generally necessary for use in introducing the desired amount of heteroatom into the aforementioned condensed oxide structure, regardless of the form of the said substance such as metal, oxide, acid or organometal. The addition of an excess of the aforesaid substance over the stoichiometrical quantity is permissible (and may sometimes be desirable) but, as has been indicated, it is generally unnecessary.

(7) A wide choice of the source of the substance comprising the heteroatom is available since the method of the invention is operative when the source material is in such various forms as metal, oxide, acid or organometal.

(8) At least some of the heteropoly compounds produced by the method of this invention have unexpected and unobvious properties. For example, ammonium heteropoly salts resulting from the method of the invention can be heat-treated in the range of from 100° to about 400° C., more particularly from about 200° C. to about 300° C., without decomposition to obtain compounds containing substantially their theoretical content of ammonia.

The inventive concept herein involved can be carried into effect in many different ways. Some of the specific embodiments of the invention illustrating types of starting reactants are given below:

(1) Reaction of metatungstic acid with the heteroatom in the form of metal, oxide, acid or organometallic compound.

(2) Reaction of ammonium metatungstate,

with the heteroatom in the form of metal, oxide, acid or organometallic compound. The ammonium heteropolytungstate is crystallized by evaporation after filtration.

(3) Reaction of ammonium paratungstate (convertible to metatungstate ion in solution) with the heteroatom in the form of meal, oxide, acid or organometallic compound.

(4) Heat treatment of the initial ammonium heteropoly compounds at elevated temperatures to drive off the excess ammonia and to obtain a compound having substantially its theoretical content of ammonia.

(5) Preparation of the corresponding free acid by cation exchange or solvent extraction of solutions of ammonium heteropolytungstate.

(6) Reaction of polymolybdic acid solution with the heteroatom in the form of metal, oxide, acid or organometallic compound.

(7) Reaction of ammonium paratungstate or ammonium paramolybdate with the heteroatom in the form of a hydrolyzable alkoxymetal or alkoxymetalloid compound.

The general procedure for effecting the reaction is simple. Taking metatungstic acid as illustrative of the heavy metal compound into which a heteroatom is to be introduced, the initial step involves merely dissolving the said acid in water. The amount of water is not critical, except when the source of the heteroatom is a hydrolyzable substance such as a hydrolyzable organometallic compound in which case the minimum amount of water employed is critical. In this case, the minimum amount of water should be at least the stoichiometrical amount, and preferably substantially in excess of the stoichiometrical amount, required for complete hydrolysis of the said hydrolyzable substance. Advantageously the amount of water is chosen so that the concentration of solids in the reaction mass is within the range of, by weight, from about 10% to about 50% of the said mass. Thus, it is desirable that the amount of water be sufficient so that insoluble matter in the reaction mass can be easily removed, e.g., by filtration, and the product is readily isolated from the filtrate, e.g., by evaporation to cause precipitation (crystallization) of the heteropolytungsten compounds. Preferably distilled or deionized water is employed to minimize contamination of the product.

The solution is then filtered, if necessary, to remove any insoluble tungstic acid that may be present, after which the substance containing the heteroatom is admixed therewith, with agitation, to provide a contacting or reactive relationship between the tungsten (or molybdenum compound) and the compound containing the heteroatom.

The mixture of reactants is stirred at ambient temperature (20°–30° C.) with or without heating above ambient temperature (for instance, up to and at the reflux temperature of the reaction mass at atmospheric pressure) as desired or as conditions may require. Higher temperatures may be desirable or necessary when the source of the heteroatom is a hydrolyzable organometallic compound, in which case the temperature and time of reaction are at least sufficient to effect substantially complete hydrolysis of the hydrolyzable compound. Evidence of the completion or approaching completion of the hydrolysis is generally indicated by a change in the visual appearance of the reaction mass, such as the development of a cloudiness or haze therein, and/or by the development of a color.

As indicated in the foregoing paragraph, the reaction may be effected at temperatures ranging from about 20° C. to about 100° C. The reaction of digestion may be initiated at ambient temperature, continued at such temperature for a part of the total reaction period, and then heated to an elevated temperature for the remainder of the period of reaction. Alternatively, the reaction may be started cold and the reaction mass then heated gradually or intermittently to the maximum temperature of reaction. From the peak digestion temperature, the reaction mass may be slowly or rapidly cooled to ambient temperature; or, it may be allowed to "age" for a prolonged period of time, e.g., from six hours to a week or more at ambient temperature before isolation of the product. Generally the reaction mass is filtered to remove impurities before such an aging process.

The reaction is ordinarily effected while the mixture is being agitated, e.g., with a stirring or other mechanical agitating means, by using a tumbling reactor, or by other conventional means.

The normal length of the reaction or digestion period (exclusive of any subsequent aging period) will vary widely depending upon such influencing factors as, for example, the particular reactants employed, the temperature of reaction, the size of the batch, the type of digestion and agitating means employed, and the like. Usually the reaction is complete within a period of from about 3 to about 72 hours, more particularly from about 4 to about 24 hours. Any impurities are removed by suitable means, e.g., by filtration, centrifuging, etc. The product is then isolated from the filtrate by any appropriate means, e.g., by evaporation of the excess water to precipitate the product from solution, which is then filtered off and dried. If further purification is desired, the product may be recrystallized one or more times from pure water or other solvent.

The method of this invention may be carried out continuously, semicontinuously, or by batch operation.

From the foregoing description, it will be seen that the heteropoly compound is recoverable directly by crystallization after removal of insoluble matter from the reaction mass and evaporation of the resulting solution. No addition of acid is required to isolate the free acid from an alkali-metal compound thereof. Product losses due to handling, etc., are minimized. Ether extraction is avoided thereby providing further advantages in handling.

In order that those skilled in the art may better understand how the present invention can be carried into effect, the following examples are given by way of illustration and not by way of limitation. All parts and percentages are by weight unless otherwise stated.

EXAMPLE 1

This example illustrates the preparation of two different heteropoly acids, viz, tungstoferric (ferrotungstic) acid and tungstoantimonic (antimonotungstic) acid, from metatungstic acid.

A. Preparation of metatungstic acid

A solution of metatungstic acid was prepared by the dropwise addition of reagent-strength hydrochloric acid to a solution containing 396 g. $Na_2WO_4 \cdot 2H_2O$ dissolved in 300 ml. $H_2O$. The latter solution was agitated and heated to 85° C. during the addition period. Hydrochloric acid was added until a pH of 2.4 was reached (165 ml.). The resulting solution of metatungstic acid was cooled, diluted to 6000 ml. volume, and passed successively through a cation-exchange resin column on the acidic cycle and an anion-exchange resin on the basic cycle in order to remove sodium and chloride ions, respectively.

The solution contained 52.6 g. $WO_3$ per liter. A sample that was allowed to evaporate at ambient temperature (about 25° C.) resulted in an amorphous, glassy product having complete solubility in water and containing less than 0.01% Na calculated as $Na_2O$. X-ray diffraction patterns showed that the product was an amorphous compound.

B. Preparation of tungstoferric acid

Two hundred (200) grams of powdered, amorphous metatungstic acid (obtained by drying the solution of A) was dissolved in one liter of deionized water and filtered to remove insoluble tungstic acid. (Note: Metatungstic acid reverts rapidly to tungstic acid on aging unless it is stored as a dilute solution whereby its storability is prolonged.) To this was added 2.2 g. of iron metal powder, which represented about 300% excess over stoichiometrical proportions. The solution turned blue almost immediately after the addition of the iron powder.

After heating to 70°–80° C. on a steam bath for 1 hour, hydrogen peroxide solution was added dropwise to remove the blue color. The solution, brownish-red in color, was filtered to isolate the product, which was dried in air at ambient temperature to yield a light-brown material. The heteropoly nature of the product was confirmed by (a) its complete solubility in water and (b) the following analytical results:

Calculated (theoretical for $H_5(FeW_{12}O_{40}) \cdot 27H_2O$): Fe, 1.65%; $WO_3$, 82.0%; $H_2O$, 14.3%. Found: 1.36%; $WO_3$, 87.9%; $H_2O$, 10.0%.

The development of the blue color in the metatungstic acid solution upon addition of the powdered iron and digestion of the mixture is interpreted as evidence for (a) the release of hydrogen ions from the metatungstic acid solution, i.e., $H_6[H_2W_{12}O_{40}]$ solution, and (b) a change in the oxidation (i.e., reduction) state of tungsten and a corresponding oxidation of the iron, possibly to an oxycation that is capable of replacing hydrogen ion in the metatungstic acid.

The presence of unconverted metatungstic acid and the lower water content explains the higher $WO_3$ content found by analysis for the tungstoferric acid of this example.

C. Preparation of tungstoantimonic acid

Two (2) grams of antimony trioxide, $Sb_2O_3$, were added to 900 ml. of a solution of metatungstic acid containing 9.3 g. $WO_3$. The mixture was digested at boiling for 1 hour and at 70°–80° C. for 3 hours. After removing excess $Sb_2O_3$ by filtration, the filtrate was evaporated at ambient temperature to obtain a water-soluble crystalline product. Spectrographic analysis showed that it contained 0.1 to 1% antimony and its X-ray pattern was isomorphous with that of tungstophosphoric (phosphotungstic) acid.

EXAMPLE 2

This example illustrates the preparation of ammonium tungstoborate, ammonium tungstophosphate, and tungstoboric acid from ammonium metatungstate. The first three of these compounds also may be named as, respectively, ammonium borotungstate, ammonium phosphotungstate and borotungstic acid.

A. Ammonium tungstoborate from ammonium metatungstate

Ammonium metatungstate, $(NH_4)_6[H_2W_{12}O_{40}] \cdot 12H_2O$ (1140 g.), was dissolved in 1000 ml. of deionized water, and 18.2 g. of boric acid was added thereto. The solution was digested on a steam bath for from 1 to 2 hours while evaporation occurred, thereby to crystallize a product that was stable and capable of being dried at 70°–80° C. $NH_3$ was released during the digestion period.

The product was characterized as follows:

(1) An X-ray diffraction examination showed an ammonium metatungstate type of diffraction pattern that was isomorphous with heteropoly acids such as phosphotungstic acid.

(2) Chemical analysis:
Calculated (theoretical for $(NH_4)_5[BW_{12}O_{40}] \cdot 5H_2O$: B, 0.30%; 0.35%; W, ($WO_3$%); 71.50 (90.90), 72.68 (91.57); $NH_3$%; 3.29, 2.79.

(3) The product containing 3.29% ammonia was fired at 260° C. in air for 3 hours and again analyzed for ammonia. The $NH_3$ content of the fired product was determined as 2.9% which is almost the theoretical percentage for $(NH_4)_5[BW_{12}O_{40}] \cdot 5H_2O$. Thermogravimetric analysis of the fired product showed formation of a stable product at 200°–300° C. corresponding to $(NH_4)_5[BW_{12}O_{40}] \cdot H_2O$. Spectrographic qualitative analysis of the fired product showed the presence of boron in the 0.1 to 1.0% range. The fired product was completely soluble in cold water.

(4) Two hundred (200) grams of the product containing 3.29% $NH_3$ was dissolved in 2 liters of deionized water and passed through a cation-exchange resin on the hydrogen cycle. The effluent solution of tungstoboric acid had a pH of 1.1 at room temperature. Evaporation under mild conditions in air resulted in a product that was soluble in water with a slight haze, was identified by X-ray diffraction as having the typical heteropoly acid structure (isomorphous with phosphotungstic acid), and had a boron content in the 0.1–1% range.

(5) The tungstoboric acid solution as prepared by ion exchange as described in (4), supra, was neutralized by the addition of reagent grade $NH_4OH$ to a pH of 4.3 and evaporated to crystallize a product containing 3.3% ammonia. The product was soluble in water and showed the typical X-ray diffraction pattern that is isomorphous with heteropoly acids such as phosphotungstic acid and similar to the product described in Paragraph 1), supra.

B. Ammonium tungstophosphate from ammonium metatungstate

Two (2) grams of $H_3PO_4$ (85%) was added to 38 grams of ammonium metatungstate dissolved in 200 ml. of deionized water. The mixture was digested with agitation for 1 hour. A fine precipitate formed. Upon evaporation of the solution to dryness, a considerable additional amount of an insoluble product formed. The product was insoluble, and tended to be colloidal with additional washes, both properties being characteristic of ammonium tungstophosphate. After drying at 110° C. for about 16 hours, X-ray diffraction examination showed a typical tungstophosphoric acid-type pattern with the slightly smaller cell size usually associated with ammonium tungstophosphate. The product contained 2.5% $NH_3$, which is nearly 50% higher than the theoretical value of 1.74% $NH_3$ for $(NH_4)_3[PW_{12}O_{40}]$. Baking at about 200°–250° C. is required to reduce the ammonia content to the correct value.

C. Tungstoboric acid from ammonium metatungstate

Ammonium metatungstate (380.4 g.) was dissolved in 1000 ml. water, and 6.18 g. of boric acid, $H_3BO_3$, was added thereto. The solution was passed through a cation-exchange resin on the hydrogen cycle, more particularly a sulfonated styrene-divinylbenzene copolymer having about 8% cross-linkage and which is commercially available under the name of Illco 211 from the Illinois Water Treatment Company, Rockford, Illinois. Ammonia was removed from the ammonium metatungstate during passage through the cation-exchange resin. The effluent was a light yellow, acidic solution which was air-dried to crystallize tungstoboric acid. The product was stable, dissolved in water to give clear, acidic solutions, and had the typical heteropoly X-ray diffraction pattern similar to that of tungstophosphoric acid. Spectrographic qualitative analysis showed boron in the 0.1–1% range.

EXAMPLE 3

Preparation of ammonium tungstovanadate from ammonium paratungstate

A slurry was made of 63.4 g. of ammonium paratungstate and 1.81 g. of $V_2O_5$ in 600 ml. of water. The mixture was digested at 95°–100° C. for 4 hours until the pH dropped to 4.6, yielding a clear solution of ammonium tungstovanadate (ammonium vanadotungstate). After filtration, a dark brown crystalline product was obtained by evaporation at 80°–85° C. After drying at 70° C. for 72 hours, the product was found to be completely soluble in water. X-ray examination showed a typical heteropoly diffraction pattern isomorphous with tungstophosphoric acid. Spectrographic analysis showed that vanadium was present in the 1–10% range. Chemical analysis showed 3.0% $NH_3$.

The corresponding free acid (i.e., tungstovanadic acid) can be prepared by passing the above-described solution of ammonium vanadotungstate at ambient temperature through a bed of cation-exchange resin (e.g., Illco 211) on the hydrogen cycle.

EXAMPLE 4

Preparation of ammonium molybdosilicate and molybdosilicic acid from ammonium paramolybdate and an organosilicon compound A solution was formed by dissolving 19.8 g. of ammonium paramolybdate, $(NH_4)_6(Mo_7O_{24}) \cdot 7H_2O$, in 300 ml. cold (about 25° C.) water, and an admixture thereof was formed of the resulting solution and 3 ml. tetraethyl orthosilicate. This solution, which immediately turned yellow, was digested for 1.5 to 2 hours at 90°–100° C. During digestion, ammonia fumes were evolved and the pH dropped to 4.8. By evaporating the solution to dryness, ammonium molybdosilicate (ammonium silicomolybdate) was crystallized as a yellow product, insoluble in cold water but soluble in hot water.

A hot aqueous solution of the yellow, crystalline ammonium molybdosilicate was passed through a weakly cationic ion-exchange resin (Illco 211) on the H+ cycle to remove ammonia. The effluent solution was acidic, and yielded a yellow crystalline product upon evaporation at 70°–80° C. It was identified by its X-ray diffraction pattern as molybdosilicic acid (silicomolybdic acid), $H_4SiMo_{12}O_{40} \cdot 5H_2O$, by comparison with a known sample of molybdosilicic acid.

EXAMPLE 5

Preparation of ammonium tungstosilicate from ammonium paratungstate and an organosilicon compound One hundred and fifty-eight and five-tenths (158.5) grams of ammonium paratungstate, $$(NH_4)_{10}W_{12}O_{41} \cdot 5H_2O$$

was slurried in 2000 ml. $H_2O$. Tetraethyl orthosilicate (10.4 g.) was added to the resulting slurry, and the mixture was digested at 95°–100° C. for 16 hours. The pH of the solution dropped to between 4 and 5, and the color changed to a purplish blue. After filtering to remove excess silica, the filtrate was evaporated at 80°–90° C. to crystallize a product which was isolated by filtration.

The white crystalline product was insoluble in cold water but soluble in hot water. X-ray examination showed the crystalline material to have a typical heteropoly X-ray diffraction pattern such as that shown, for example, by tungstophosphoric acid. The X-ray diffraction pattern also was comparable to that of the product isolated as a reaction product of tungstosilicic acid, $$H_4[SiW_{12}O_{40}] \cdot 6H_2O$$

with a solution of ammonium nitrate, and both products showed the typical heteropoly X-ray diffraction pattern exemplified by tungstophosphoric acid. (In preparing the last-described reaction product, 298.8 g. of tungstosilicic acid, dissolved in 500 ml. water, was mixed with 32 g. $NH_4NO_3$ in 100 ml. water. A white product was obtained by filtration and dried at 110° C. The product was insoluble in cold water but soluble in hot water.)

Spectrographic qualitative analysis of the product of this example showed Si to be present in the range of from 1 to 10%. Chemical analysis showed 2.9% $NH_3$ versus a theoretical value of 2.3% $NH_3$ for $$(NH_4)_4[SiW_{12}O_{40}] \cdot 6H_2O$$

EXAMPLE 6

Preparation of ammonium ferrotungstate from ammonium metatungstate

Ammonium metatungstate (3804 g.) was dissolved in 2000 ml. of water, and 55.4 g. of powdered iron metal was added thereto. The mixture was digested with agitation at boiling for 2 hours. It turned a deep blue color with the formation of some precipitate. The resulting slurry was evaporated by heating at approximately 80° C. to yield a deep blue, hard mass. A portion (2 lbs.) of this mass was broken up and heated for 85 minutes at 500° F. The resulting product was a tan-colored material that was still incompletely soluble in hot water. The insoluble material was removed by filtration. Upon analysis it was found that the iron content was low by about 1% as compared with the theoretical. Hence an additional one gram of powdered iron metal was added to the filtrate, and the mixture was boiled for 2 hours. No blue color developed; however, a reddish-brown precipitate formed. The precipitate was removed by filtration, and the resulting light-brown solution was evaporated to yield a deep brown syrup. Upon cooling, this syrup crystallized into a brown powder. Chemical analysis of this powder showed the following.

Theoretical: $F_2$, 1.77%; W, 69.94%; $NH_3$, 2.69. Found: Fe, 1.62; W, 74.7; $NH_3$, 3.2.

EXAMPLE 7

A. Preparation of ammonium arsenotungstate from ammonium metatungstate

Seventy-six grams of ammonium metatungstate, $$(NH_4)_6[H_2W_{12}O_{40}] \cdot 2H_2O$$

was dissolved in 100 ml. water. Three grams of arsenic pentoxide, $As_2O_5$, was added to the solution of ammonium metatungstate, yielding a turbid solution. Upon heating this turbid solution to 90° C., with agitation, a clear solution was obtained in one hour. Evaporation of this solution to remove the solvent resulted in a water-soluble ammonium arsenotungstate.

B. Preparation of arsenotungstic (tungstoarsenic) acid from ammonium arsenotungstate The corresponding arsenotungstic acid was obtained from the ammonium arsenotungstate (ammonium tungstoarsenate), prepared as described in (A), supra, by passing an aqueous solution of the latter through a column of cation-exchange resin (Illco 211) on the hydrogen cycle, yielding a highly acidic effluent. Crystalline arsenotungstic acid was recovered from this effluent by careful evaporation of the aqueous solvent. The crystalline product, identified by X-ray diffraction examination, was soluble in water and resulted in a strongly acidic, aqueous solution.

EXAMPLE 8

A. Preparation of ammonium germanotungstate from ammonium paratungstate

One hundred and fifty-eight and five-tenths (158.5) grams of ammonium paratungstate, $(NH_4)_{10}H_{10}W_{12}O_{46}$, was slurried in two liters of deionized water, and 5.2 g. of germanium dioxide was added to the resulting slurry. This slurry was then heated and agitated at boiling temperature (about 95°–100° C.) for about 6 hours. During this period the pH of the reaction mass dropped from slightly above 7.0 to 5.3, and substantially all of the reactants and product were solubilized. The solution was filtered, and the filtrate was heated on a steam bath in order to remove the aqueous solvent. After cooling the solution, the product, crude ammonium germanotungstate (ammonium tungstogermanate), crystallized from the solution. This crude product was redissolved in hot water, filtered to remove insoluble material, and again crystallized. The recrystallized ammonium germanotungstate, identified as such by X-ray diffraction examination, was soluble in hot water but relatively insoluble in cold water.

B. Preparation of germantotungstic (tungstogermanic) acid from ammonium germanotungstate The corresponding germanotungstic acid was prepared from an aqueous solution of ammonium germanotungstate Fifty (50) grams of the ammonium salt, prepared as described in (A), supra, was dissolved in 500 ml. water at 70° C., yielding a solution which was slightly acidic (pH of about 5). After cooling to ambient temperature, this solution was passed through a bed of cation-exchange resin (Illco 211) on the hydrogen cycle. The effluent was highly acidic. It was evaporated on a steam bath to yield a highly water-soluble product, identified by X-ray diffraction examination, as germanotungstic acid.

It is to be understood that the foregoing detailed description is given merely by way of illustration and that many variations may be made therein without departing from the spirit and scope of the invention.

What is claimed is:

1. The method of preparing heteropolytungstic and heteropolymolybdic acids and ammonium salts of the said acids, the heteroatom in the said acids and salts being selected from group (A) consisting of silicon, aluminum, vanadium, titanium, iron, nickel, cobalt, antimony, niobium, germanium, tin and cerium when the heteropoly compound is heteropolytungstic acid or heteropolymolybdic acid, and being selected from the group consisting of (B) the aforementioned heretoatoms of group (A) and, in addition, arsenic, boron, and phosphorus when the heteropoly compound is an ammonium salt of the aforesaid heteropoly acids, said method comprising directly introducing the heteroatom into the condensed oxide structure of a nonheteropolytungstic or a nonheteropolymolybdic acid or an ammonium salt thereof by contacting, in aqueous medium and at a temperature within the range of from about 20° C. to about 100° C., (a) a compound of the group consisting of a polytungstic acid, a polymolybdic acid, and the ammonium salts of the said acids, said acids and salts being water-soluble and having a condensed oxide polyhedral structure, with (b) a substance of the group consisting of elemental metals, oxides and acids of elemental metals, and hydrolyzable organometallic compounds, the said substance having a heteroatom of the aforesaid group (A) when the heteropoly compound to be produced is heteropolytungstic acid or heteropolymolybdic acid, and having a heteroatom of group (B) when the heteropoly compound to be produced is an ammonium salt of the aforesaid heteropoly acids, the amount of the substance of (b) in the said aqueous medium being sufficient to provide at least 0.5 gram atom of the aforesaid heteroatom for each 12 gram atoms of tungsten or molybdenum in the tungsten or molybdenum compounds of (a).

2. The method as in claim 1 which includes the additional step of isolating from the reaction mass the heteropolytungsten or heteropolymolybdenum product of the reaction.

3. The method as in claim 1 wherein the substance of (b) is an elemental metal having the defined hereroatom, and the amount thereof is sufficient to provide from 0.5 to about 2.0 gram atoms of the heteroatom for each 12 gram atoms of tungsten or molybdenum in the heteropolytungsten or –molybdenum compound of (a).

4. The method as in claim 1 wherein the substance of (b) is an oxide of an elemental metal having the defined heteroatom, and the amount thereof is sufficient to provide from 0.5 to about 2.0 gram atoms of the heteroatom for each 12 gram atoms of tungsten or molybdenum in the heteropolytungsten or –molybdenum compound of (a).

5. The method as in claim 1 wherein the substance of (b) is an acid of an elemental metal having the defined heteroatom, and the amount thereof is sufficient to provide from 0.5 to about 2.0 gram atoms of the heteroatom for each 12 gram atoms of tungsten or molybdenum in the heteropolytungsten or –molybdenum compound of (a).

6. The method as in claim 1 wherein the substance of (b) is a hydrolyzable organometallic compound having the defined heteroatom, and the amount thereof is sufficient to provide from 0.5 to about 2.0 gram atoms of the heteroatom for each 12 gram atoms of tungsten or molybdenum in the heteropolytungsten or –molybdenum of (a).

7. The method as in claim 1 wherein the compound of group (a) is a polytungstic acid; and the method includes the additional step of isolating from the reaction mass the heteropolytungstic acid which is the product of the reaction.

8. The method as in claim 1 wherein the compound of group (a) is an ammonium polytungstate; and the method includes the additional step of isolating from the reaction mass the ammonium heteropolytungstate which is the product of the reaction.

9. The method as in claim 1 wherein the compound of group (a) is an ammonium polymolybdate; and the method includes the additional step of isolating from the reaction mass the ammonium heteropolymolybdate which is the product of the reaction.

10. The method as in claim 7 wherein the compound of group (a) is metatungstic acid; the substance of group (b) is iron powder; and the reaction product that is isolated from the reaction mass is ferrotungstic acid.

11. The method as in claim 7 wherein the compound of group (a) is metatungstic acid; the substance of group (b) is antimony trioxide; and the reaction product that is isolated from the reaction mass is antimonotungstic acid.

12. The method as in claim 8 wherein the ammonium tungstate is ammonium metatungstate; the substance of group (b) is boric acid; and the reaction product that is isolated from the reaction mass is ammonium borotungstate.

13. The method as in claim 8 wherein the ammonium tungstate is ammonium metatungstate; the substance of group (b) is phosphoric acid; and the reaction product that is isolated from the reaction mass is ammonium phosphotungstate.

14. The method as in claim 8 wherein the ammonium tungstate is ammonium metatungstate; the substance of group (b) is iron powder; and the reaction product that is isolated from the reaction mass is ammonium ferrotungstate.

15. The method as in claim 8 wherein the ammonium tungstate is ammonium metatungstate; the substance of group (b) is arsenic pentoxide; and the reaction product that is isolated from the reaction mass is ammonium arsenotungstate.

16. The method as in claim 8 wherein the ammonium tungstate is ammonium paratungstate; the substance of group (b) is germanium dioxide; and the reaction product that is isolated from the reaction mass is ammonium germanotungstate.

17. The method as in claim 8 wherein the ammonium tungstate is ammonium paratungstate; the substance of (b) is a vanadium oxide having at least some solubility in the aqueous reaction medium; and the reaction product that is isolated from the reaction mass is ammonium vanadotungstate.

18. The method as in claim 8 wherein the ammonium tungstate is ammonium paratungstate; the substance of (b) is tetraethyl orthosilicate; and the reaction product that is isolated from the reaction mass is ammonium silicotungstate.

19. The method as in claim 18 wherein the amount of the tetraethyl orthosilicate is sufficient to provide from 0.5 to about 2.0 gram atoms of silicon for each 12 gram atoms of tungsten in the ammonium silicotungstate obtained as product of the method; and the amount of water in the aqueous medium wherein the reactants of (a) and (b) are contacted corresponds to from about 5 to about 25 moles of water for each mole of tetraethyl orthosilicate.

20. The method as in claim 8 wherein the ammonium heteropolytungstate as initially isolated from the reaction mass contains an amount of $NH_3$ substantially in excess of the theoretical amount for the particular isolated compound; and the isolated compound is reduced to substantially its theoretical content of $NH_3$ by heating at a temperature within the range of from 100° C. to about 400° C.

21. The method as in claim 18 wherein the temperature to which the isolated compound is heated is within the range of from about 200° C. to about 300° C.

References Cited
UNITED STATES PATENTS

| | | | |
|---|---|---|---|
| 2,503,991 | 4/1950 | Bechtold | 23—140 |
| 2,788,258 | 4/1957 | Arnold et al. | 23—51 |
| 2,900,235 | 8/1959 | Arnold et al. | 23—139 |
| 3,227,518 | 1/1966 | Kennedy | 23—140 X |
| 3,288,562 | 11/1966 | Laferty | 23—140 |
| 3,361,518 | 2/1968 | Chiola et al. | 23—23 |

OSCAR R. VERTIZ, *Primary Examiner.*
HERBERT T. CARTER, *Assistant Examiner.*

U.S. Cl. X.R.

23—51, 140

UNITED STATES PATENT OFFICE
CERTIFICATE OF CORRECTION

Patent No. 3,425,794                                                February 4, 1969

Vincent Chiola et al.

It is certified that error appears in the above identified patent and that said Letters Patent are hereby corrected as shown below:

Column 1, line 29, "place." should read -- place.) --. Column 5, line 63, "of" should read -- or --. Column 9, lines 5 and 6, "organoslicon" should read -- organosilicon --. Column 10, line 16, "$F_2$" should read -- Fe --. Column 11, line 55, "hereroatom" should read -- heteroatom --.

Signed and sealed this 7th day of April 1970.

(SEAL)
Attest:

Edward M. Fletcher, Jr.                                       WILLIAM E. SCHUYLER, JR.
Attesting Officer                                                     Commissioner of Patents